United States Patent [19]

Maeda

[11] 4,029,322

[45] June 14, 1977

[54] PICKUP ARM ASSEMBLY

[75] Inventor: Keijiro Maeda, Yokohama, Japan

[73] Assignee: Sony Corporation, Tokyo, Japan

[22] Filed: Jan. 14, 1976

[21] Appl. No.: 648,864

[30] Foreign Application Priority Data

Jan. 18, 1975   Japan ............ 50-8847[U]

[52] U.S. Cl. .................................. 274/37
[51] Int. Cl.² .......................... G11B 3/02
[58] Field of Search ......... 274/24, 26, 23, 25, 274/37; 285/322, 323; 403/300, 314, 316; 339/270 R, 268 R, 268 S

[56] References Cited

UNITED STATES PATENTS

| | | | |
|---|---|---|---|
| 1,677,326 | 7/1928 | Bowen | 339/268 S |
| 1,847,972 | 3/1932 | Morris | 339/268 S |
| 2,090,380 | 8/1937 | Terry | 285/323 |
| 2,295,899 | 9/1942 | Hoppenstand | 339/268 S |
| 2,828,473 | 3/1958 | High | 339/268 |

*Primary Examiner*—Harry N. Haroian
*Attorney, Agent, or Firm*—Lewis H. Eslinger; Alvin Sinderbrand

[57] ABSTRACT

A phonograph pickup arm assembly in which one end of the arm is fitted with a quick-connect socket for receiving a cartridge shell. The socket is slotted and the cartridge shell includes a pin for insertion into the slot. The socket includes a tapered surface and a nut cooperates with the tapered surface to force a resiliently deformable portion of the socket into tight engagement with an embraced portion of the cartridge shell.

8 Claims, 4 Drawing Figures

PICKUP ARM ASSEMBLY

BACKGROUND OF THE INVENTION

1. Field of the Invention

This invention relates to generally mounting devices for joining a cartridge shell to the free end of a pickup arm of a phonograph record player.

2. Description of the Prior Art

A typical phonograph pickup arm of the type intended for use with a plug-in cartridge shell is provided with a socket disposed at the free end of the pickup arm. A plug-like formation on the cartridge shell is held in the socket by a nut encircling the end of the pickup arm. Usually pin and slot or spline arrangements ensure that the shell will not rotate when the nut is turned and that the cartridge is vertically aligned. Unfortunately, such prior art arrangements do not provide sufficient rigidity so that the shell exhibits a resonant frequency of its own, rather than the shell and arm forming a mechanically united assembly with an overall resonant frequency.

SUMMARY OF THE INVENTION

One object of the present invention is to provide a coupling device for joining a cartridge holding shell to a phonograph pickup arm, whereby precise alignment of the cartridge shell is ensured.

Another object of the present invention is to provide a coupling device for joining a cartridge holding shell to a pickup arm so that the rigidity of the coupling is enhanced, whereby misalignment or tilt of the cartridge shell is prevented.

Another object of the present invention is to provide a phonograph pickup arm assembly in which the cartridge holding shell and arm form a mechanically united assembly to minimize or reduce a separate mechanical reasonance of the cartridge.

A further object of the present invention is to provide resiliently deformable locking means for rigidly joining a phonograph cartridge to a pickup arm for angularly locating the cartridge with respect to the pickup arm and preventing misalignment and tilt with respect thereto.

A still further object of the present invention is to provide a pickup arm assembly which is simply constructed, can be manufactured by mass production techniques, and is inexpensive.

In accordance with the foregoing features there is provided a pickup arm assembly comprising a first hollow cylindrical member mounted on a pickup arm, said member having at least one radially disposed slit; a head shell having a plug to be inserted into said first hollow cylindrical member; a second cylindrical member disposed and longitudinally movable on said first cylindrical member; and locking means for reducing the diameter of said first cylindrical member in response to a longitudinal displacement of said second cylindrical member, whereby said plug is locked in said second cylindrical member.

A preferred embodiment of the invention will be described with reference to the accompanying drawings, in which.

DESCRIPTION OF THE PREFERRED EMBODIMENTS

Figure 1:
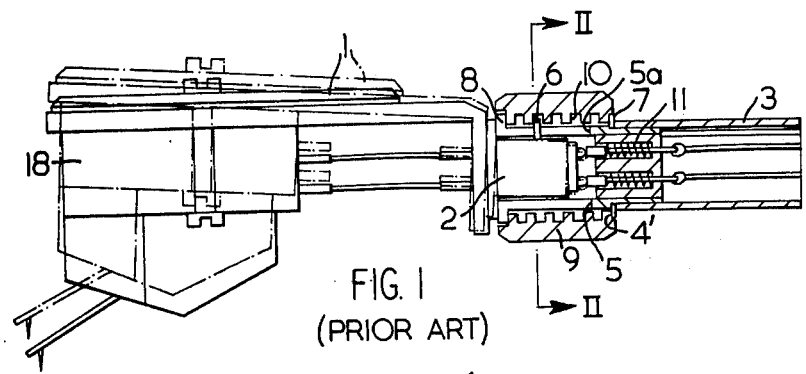
FIG. 1 is a side elevational view of a prior art pickup assembly, showing a conventional coupling device in section.

Referring initially to the prior art pickup arm assembly shown in FIG. 1, the outer portion or free end 3 of a pickup arm is indicated. Shell 1, containing a cartridge 18, includes a plug 2 from which a radially disposed pin 6 protrudes. The pickup arm 3 receives a hollow cylindrical member 5 which is longitudinally slotted as shown at 5a. The member 5 is provided with a flange 8. An insulating ferrule 11 is positioned within cylindrical member 5 and retains the usual spring loaded electrical contacts. A nut 9 bears against the flange 8 at one end and longitudinal movement is restricted by a washer 7 disposed between a shoulder 4 on the cylindrical member 5 and an outer edge of the pickup arm 3. The pin 6 engages a thread formation 10 on the interior of the nut 9. The plug 2 is drawn into and held in the member 5 by the cooperation between the pin 6 and the thread formation 10 when the nut is rotated.

Figure 2:
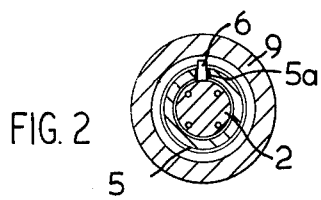
FIG. 2 is a cross-sectional view taken along lines II—II in FIG. 1.

FIG. 2 shows a cross-section of the prior art pickup arm assembly shown in FIG. 1 taken along the lines II—II. The pin 6 of the plug 2 is shown extending through the slot 5a in member 5 and into a space between threads of the thread formation 10.

The prior art device thus described lacks adequate rigidity, thereby permitting the shell to move upwardly to the position shown in chain-dot. The rigidity of such a device can only be improved through the adoption of unacceptably high manufacturing tolerances which restrict interchangeability of cartridge shells made by different manufacturers.

Figure 3:
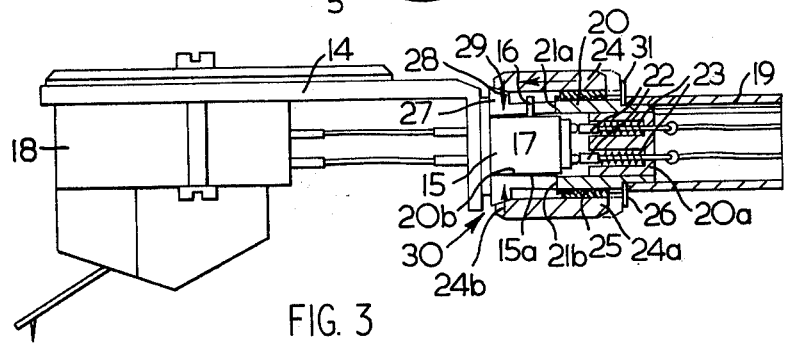
FIG. 3 is a side elevational view of a pickup assembly, showing an improved coupling device, in section, according to the present invention.

Referring now to FIG. 3, a coupling device according to the present invention is shown having a shell 14 carrying a cartridge 18. Plug 17 is affixed to shell 14. A radially aligned pin 16 protrudes from the side of the plug 17. The end of a pickup arm 19 receives a socket member 20 which includes a radially aligned longitudinal slot 29 into which the pin 16 may slide. The socket member 20 is terminated with a flange 27 whose outer rim 28 is tapered.

A portion 25 of the outer cylindrical surface of the socket 20 is threaded to engage a corresponding internal thread formation on a nut 24. The outer end of the nut 24 has an internal taper corresponding to and abutting the taper on the rim 28 of the socket. A washer 31, disposed between the end of the arm 19 and the socket member 20, restricts longitudinal movement of the nut 24.

In operation, the plug 17 with its pin 16 aligned with the slot 29 is pushed manually into the socket 20 and, simultaneously, the nut 24 is screwed outwardly until the tapered surface thereon abuts the corresponding tapered surface 28 on the socket. This action provides an inwardly directed thrust as shown by arrow 24b which rigidly joins the shell to the arm.

Figure 4:
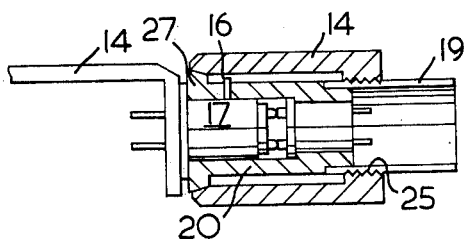
FIG. 4 is a side elevational view of a further embodiment of the present invention.

Referring now to FIG. 4, there is shown a slightly simplified version of the embodiment shown in FIG. 3. In this case, the male thread 25 is formed directly adjacent the end of the pickup arm 19. In other respects the FIG. 4 embodiment functions in like manner to that shown in FIG. 3.

It is to be understood that both the FIG. 3 and FIG. 4 embodiments may be simplified further through the use of one, rather than two, tapered surfaces.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

I claim:

1. A phonograph pickup arm assembly comprising:
   a pickup arm having an outer end portion;
   a first hollow cylindrical member having a longitudinal axis and mounted on said outer end portion of said pickup arm, said member having at least one radially disposed slit;
   a phonograph transducer having a connecting plug to be inserted into said first hollow cylindrical member for mounting said phonograph transducer to the outer end portion of said pickup arm;
   a second cylindrical member disposed about said first cylindrical member and longitudinally moveable with respect to said first cylindrical member; and
   locking means for reducing the diameter of said first cylindrical member in response to a longitudinal displacement of said second cylindrical member to clamp said transducer to said pickup arm, whereby said plug is locked in said first cylindrical member.

2. A phonograph pickup arm assembly according to claim 1, wherein said locking means comprises a tapered surface on at least one of said first and second cylindrical members.

3. A phonograph pickup arm assembly according to claim 2, wherein said locking means further comprises a second tapered surface on the other of said first and second cylindrical members, said first and second tapered surfaces being aligned such that said longitudinal displacement of said second cylindrical member contacts said first tapered surface with said second tapered surface.

4. A phonograph pickup arm assembly according to claim 3, wherein said first cylindrical member has a flange upon which said tapered surface is disposed.

5. A phonograph pickup arm assembly according to claim 1, in which said plug further comprises a pin projecting radially therefrom and inserted into said radially disposed slit, whereby rotational displacement of said phonograph transducer is substantially prevented.

6. A phonograph pickup arm assembly according to claim 1, wherein said locking means comprises an inner tapered surface on said second cylindrical member and an outer tapered surface on said first cylindrical member.

7. A phonograph pickup arm assembly according to claim 6, wherein said second cylindrical member includes an internal thread and said first cylindrical member includes an external thread engaging said internal thread.

8. A phonograph pickup arm assembly according to claim 1, wherein said second cylindrical member is provided with an internal thread and said outer end of said pickup arm is provided with an external thread engaging said internal thread.

* * * * *